United States Patent
Navas Cornejo et al.

(10) Patent No.: US 9,949,202 B2
(45) Date of Patent: Apr. 17, 2018

(54) ACCESS NETWORK DISCOVERY AND SELECTION FUNCTION (ANDSF) USING POLICY VALIDITY CONDITIONS AND AREA UPDATE POLICY INSTRUCTIONS

(71) Applicant: Telefonaktiebolaget LM Ericsson (publ), Stockholm (SE)

(72) Inventors: Angel Navas Cornejo, Leganes (ES); Fabian Castro Castro, Arillo/Oleiros/A Coruña (ES); Victor Ferraro Esparza, Valencia (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/111,370

(22) PCT Filed: Jan. 17, 2014

(86) PCT No.: PCT/EP2014/050861
§ 371 (c)(1),
(2) Date: Jul. 13, 2016

(87) PCT Pub. No.: WO2015/106817
PCT Pub. Date: Jul. 23, 2015

(65) Prior Publication Data
US 2016/0337950 A1    Nov. 17, 2016

(51) Int. Cl.
*H04W 4/00* (2018.01)
*H04W 48/16* (2009.01)
(Continued)

(52) U.S. Cl.
CPC .......... *H04W 48/16* (2013.01); *H04W 4/02* (2013.01); *H04W 48/04* (2013.01); *H04W 48/14* (2013.01); *H04W 48/18* (2013.01)

(58) Field of Classification Search
CPC ..... H04W 48/16; H04W 48/00–48/06; H04W 48/08–48/14; H04W 8/08
(Continued)

(56) References Cited

U.S. PATENT DOCUMENTS 9,015,068 B1 * 4/2015 Bertz .................. G06Q 30/0633
                                                                 705/26.8
9,497,740 B2 * 11/2016 Gupta ............... H04W 52/0258
(Continued)

FOREIGN PATENT DOCUMENTS

WO    WO 2014/005654    1/2014

OTHER PUBLICATIONS

3GPP TS 24.302 v12.0.0; Technical Specification; 3rd Generation Partnership Project; Technical Specification Group Core Network and Terminals; Access to the 3GPP Evolved Packet Core (EPC) via non-3GPP access networks; Stage 3 (Release 12)—Mar. 2013.
(Continued)

*Primary Examiner* — Huy C Ho
(74) *Attorney, Agent, or Firm* — Baker Botts, LLP (57) ABSTRACT

According to the invention in a first aspect, there is provided a communication device (114, 200) configured to form part of a telecommunications network and to carry out an access network discovery and selection function, ANDSF. The communication device comprises a receiver (204) configured to receive a request for access network policy information relating to a user equipment, UE, (100, 300) and current UE location data. The communication device comprises a policy information unit (214) configured to determine primary information comprising access network policy information for the UE based at least in part on the current UE location data. The policy information unit is further configured to determine secondary information specifying one or more further UE locations at which the UE should
(Continued)

make a further request for access network policy information. The communication device comprises a transmitter (202) configured to transmit the primary and secondary information towards the UE.

32 Claims, 5 Drawing Sheets

(51) Int. Cl.
  *H04W 48/14* (2009.01)
  *H04W 4/02* (2018.01)
  *H04W 48/04* (2009.01)
  *H04W 48/18* (2009.01)
  *H04W 24/00* (2009.01)

(58) Field of Classification Search
  USPC ........................................................ 455/456.1
  See application file for complete search history.

(56) References Cited

U.S. PATENT DOCUMENTS

| | | | |
|---|---|---|---|
| 2011/0310866 A1 | 12/2011 | Kennedy et al. | |
| 2013/0012260 A1* | 1/2013 | Salkintzis | H04W 48/08 455/550.1 |
| 2013/0208696 A1* | 8/2013 | Garcia Martin | H04W 36/32 370/331 |
| 2014/0071854 A1* | 3/2014 | Xiang | H04W 48/16 370/254 |

OTHER PUBLICATIONS

3GPP TS 24.302 v12.2.0; Technical Specification; 3rd Generation Partnership Project; Technical Specification Group Core Network and Terminals; Access to the 3GPP Evolved Packet Core (EPC) via non-3GPP access networks; Stage 3 (Release 12)—Sep. 2013.

3GPP TS 23.402 v.12.0.0; Technical Specification; 3rd Generation Partnership Project; Technical Specification Group Services and System Aspects; Architecture enhancements for non-3GPP accesses (Release 12)—Mar. 2013.

3GPP TS 23.402 v.12.2.0; Technical Specification; 3rd Generation Partnership Project; Technical Specification Group Services and System Aspects; Architecture enhancements for non-3GPP accesses (Release 12)—Mar. 2013.

3GPP TS 24.312 v12.0.0; Technical Specification; 3rd Generation Partnership Project; Technical Specification Group Core Network and Terminals; Access Network Discovery and Selection Function (ANDSF) Management Object (MO) (Release 12)—Mar. 2013.

Mobile Networks; Access Network Discovery and Selection in the Evolved 3GPP Multi-Access System Architecture by Joachim Sachs and Magnus Olsson; European Transactions on Telecommunications; Eur. Trans. Telecomms. 2010; 21:544-557 (wileyonlinelibrary.com)—Apr. 25, 2010.

PCT Notification of Transmittal of the International Search Report and the Written Opinion of the International Searching Authority, or the Declaration for International application No. PCT/EP2014/050861—dated Oct. 31, 2014.

* cited by examiner

ACCESS NETWORK DISCOVERY AND SELECTION FUNCTION (ANDSF) USING POLICY VALIDITY CONDITIONS AND AREA UPDATE POLICY INSTRUCTIONS

PRIORITY

This nonprovisional application is a U.S. National Stage Filing under 35 U.S.C. § 371 of International Patent Application Serial No. PCT/EP2014/050861, filed Jan. 17, 2014, and entitled "Access Network Discovery and Selection Function (ANDSF) Using Policy Validity Conditions and Area Update Policy Instructions."

TECHNICAL FIELD

The invention is directed to access network selection for a user equipment (UE) in a network. More specifically, the invention is related to, but is not limited to, the selection of the access network in certain locations.

BACKGROUND

At present, a UE can access an Evolved Packet System (EPS) via a third generation partnership project (3GPP) access network and also via a non-3GPP access network. Offloading of mobile traffic through a non-3GPP access, such as Wi-Fi access (e.g. via wireless local area network (W-LAN) access points), can be used by network operators to provide a best service to final users, who can use the higher bandwidth Wi-Fi network when the performance or quality that can be offered by, for example, a 3GPP access network is not enough for the services required.

Additionally, some operators are considering Wi-Fi as a coverage extension to their networks, complementing the radio coverage by means of Wi-Fi access points, not only in their home networks but also when roaming. For example, some international roaming programs for mobile subscribers connect automatically to Wi-Fi hotspots via subscriber identity module (SIM) authentication when roaming abroad. Further, specific international Wi-Fi hotspots may be designated and those hotspots may be accessed seamlessly using SIM-based credentials on a smartphone or laptop, obviating the need for a user to launch a client or enter a username and password to gain Wi-Fi hotspot access.

Therefore, there is a trend towards mobile operators leveraging Wi-Fi not just for domestic offloading to ease congestion but in a roaming scenario as well to give better roaming rates to end users and a better user experience.

For access network selection, a new functionality called an Access Network Discovery and Selection Function (ANDSF) has been defined by several 3GPP specifications. In particular, the functionality of the ANDSF is described, for example, in 3GPP specification TS 23.402 v12.2.0, or by the 3GPP specification TS 24.302 v12.2.0. Details of the data that can be managed by the messages exchanged between an ANDSF and a UE are described, for example, in the 3GPP specification 3GPP TS 24.312 v12.2.0.

The ANDSF may be thought of as a control node operable to send to a UE access network discovery and selection policy messages comprising access network policy information, wherein the access network policy information is usable by the UE so as to allow it to, for example, change a data connection from a first radio access network to which the UE is connected (e.g. a data connection established between the UE and a 3GPP or non-3GPP access network) to a second access network. The ANDSF is an example of a control node operable to control access by a UE to access networks.

Typically, an ANDSF contains data management and control functionality necessary to provide network discovery and selection assistance data to the UE over the S14 interface in accordance with operator policy. An ANDSF can access a subscriber profile stored in a User Data Repository (UDR) by means of Ud interface.

Typically, an ANDSF may be aware of the access points available (for example, Wi-Fi and/or 3GPP) in an operator network, and their geographical distribution. For this purpose, a centralised database, such as a geodetic database, stores information about the different location areas and the operator cells and access points within each location area. This information can be accessed by all the ANDSFs deployed in a network to determine the Wi-Fi networks that can be discovered in the vicinity of each cell.

Access network policy information comprising, for example, information on whether 3GPP or non-3GPP access network should be used at a given location, is downloaded to a UE from an ANDSF. The download is dependent on triggers configured in the UE (PULL operation mode) or on triggers configured in the ANDSF (PUSH operation mode).

An ANDSF can provide some triggers for the UE to initiate retrieval of new access network policies by making use of the UpdatePolicy flag as specified in the TS 24.312 v12.2.0. Typically, a trigger provided to the UE may be based on the value of the UpdatePolicy leaf, as defined in 3GPP TS 24.312 v12.2.0, which may be used by the UE to determine whether or not to request update policies when the UE leaves a determined validity area relating to the current access network policy.

Typically, there are three types of information provided by the ANDSF:
Inter-system mobility policy (ISMP)
  The ISMP is an access network policy comprising a set of operator-defined rules and preferences that affect the inter-system mobility decisions taken by a UE. The UE uses the inter-system mobility policy when it can route IP traffic only over a single radio access interface at a given time, for example, when it is not Internet Protocol (IP) Flow Mobility (IFOM) capable or its IFOM capability is disabled
Access network discovery information
  Upon UE request, the ANDSF may provide a list of access networks available in the vicinity of the UE for all the access technology types requested by the UE, if any are requested
Inter-System Routing Policy (ISRP)
  The ISRP is also an access network policy. The ANDSF may provide a list of Inter-System Routing Policies to a UE that are capable of routing IP traffic simultaneously over multiple radio access interfaces. The UE uses the inter-system routing policies when it can route IP traffic simultaneously over multiple radio access interfaces, for example, when it is an IFOM capable UE with the IFOM capability enabled or a Multi-Access Packet Data Network (PDN) Connectivity (MAPCON) capable UE with the MAPCON capability enabled
An ANDSF may take access selection decisions based on different criteria. Some identified use cases include:
  Based on information related to current UE location: a UE that is attached to the 3GPP access network is instructed by the ANDSF via the S14 reference point to select Wi-Fi as the access network when the UE is at the current UE location or when the UE moves out of the current UE location Based on congestion: selection of Wi-Fi as the access network when the subscriber moves to a congested cell or selection of 3GPP access when Wi-Fi is congested Based on subscription information Based on time: the ANDSF selects between 3GPP access and Wi-Fi access depending on time of day—for example, Wi-Fi may be selected only at certain periods of time during the day where it is known that congestion of 3GPP access is foreseen Two different procedures are defined, Push and Pull mode, which are described below.

In pull mode operation, UE to ANDSF communication is initiated by the UE:

The UE discovers the ANDSF via Domain Name System (DNS) lookup or Dynamic Host Configuration Protocol (DHCP)

The UE sends a query to the ANDSF to retrieve or update policy data and/or information about available access networks The UE may provide its location information (for example, cell identities) to the ANDSF The ANDSF provides the UE with policy data and/or information about available access networks based on the current UE location The UE performs network detection and selection taking into account the access network specific requirements and the UE's local policy, along with the information provided by the ANDSF In push mode operation, the UE to ANDSF communication is initiated by the ANDSF:

The ANDSF sends a Wireless Applications Protocol (WAP) Push message over SMS bearer towards the UE The UE sends a query to ANDSF to retrieve or update policy data and/or information about available access networks The UE may provide to the ANDSF the UE's location information (for example, cell identities)

The ANDSF provides the UE with policy data and/or information about available access networks The UE performs network detection and selection taking into account the access network specific requirements and the UE's local policy, along with the information provided by the ANDSF Triggers for push mode operation are implementation dependent in the ANDSF.

The access network policy information transmitted to the UE by the ANDSF over the S14 interface may comprise a validity area (see TS 24.312), which defines the area where a policy rule is valid. This means that the ANDSF downloads to the UE access network selection rules and the area where a rule is applicable. Out of this area the rule shall be discarded. For example, the ANDSF may indicate to the UE that Wi-Fi access has preference over Long Term Evolution (LTE) only in a certain area.

Location granularity can be at different levels and depends on the radio access type. For example, for 3GPP radio access types the following location identifiers apply:

For Global System for Mobile Communications (GSM) Enhanced Data Rates for GSM Evolution (EDGE) Radio Access Network (GERAN): Location Area Code (LAC) and GERAN Cell Identifier (GERAN CI)

For Universal Mobile Telecommunications System (UMTS) Terrestrial Radio Access Network (UTRAN): UTRAN Cell Identifier (UTRAN CI)

For Evolved UTRAN (E-UTRAN): Tracking Area Identifier (TAI) and E-Utran Cell Global Identifier (ECGI)

As used herein, the term "location area" encompasses a set of base stations that are grouped together to optimise signalling. A location area may be an area in which, after having performed a location update once, MSs may roam without being required to perform subsequent location updates for reasons of location change. A location area may comprise one or more cells. This concept is applicable in 2G and 3G 3GPP access. In 4G access the term "tracking area" may be used instead.

As used herein, the term "tracking area" may define an LTE counterpart of the location area and routing area. A tracking area may be defined as a set of cells.

From the above, it will be understood that the terms location area and tracking area are similar and generally relate to similar features of different network technologies. Therefore, the terms (and any associated terms) are used interchangeably herein.

As used herein, the term "routing area" may be a packet switch domain equivalent of the location area or tracking area. A "routing area" is typically a subdivision of a "location area".

Typically, the UE is configured to trigger in pull mode the retrieval of policies whenever there is a location change. The ANDSF cannot send to the UE all the policies available in the operator network since this would represent an unmanageable amount of information for the UE. Therefore the ANDSF typically only sends to the UE the policies applicable to the area where the UE is located. Therefore, the UE requests new access network policies from the ANDSF at any location change, even when no policies apply to the new location area. This mechanism is inefficient when the UE moves into areas for which there is no access network policy information in the ANDSF, and results in an unnecessary increment in the signaling between the UE and the ANDSF.

SUMMARY

To overcome these problems, or at least to mitigate them, according to the invention in a first aspect, there is provided a communication device configured to form part of a telecommunications network and to carry out an access network discovery and selection function, ANDSF. The communication device comprises a receiver configured to receive a request for access network policy information relating to a user equipment, UE, and current UE location data. The communication device comprises a policy information unit configured to determine primary information comprising access network policy information for the UE based at least in part on the current UE location data. The policy information unit is further configured to determine secondary information specifying one or more further UE locations at which the UE should make a further request for access network policy information. The communication device comprises a transmitter configured to transmit the primary and secondary information towards the UE.

Generally speaking, the access network policy information may comprise access network selection rules and validity areas where each rule is applicable.

Optionally, the one or more further UE locations identify one or more areas, each area identifying one or more radio access network technologies.

Optionally, the one or more further UE locations identify one or more areas for which access network policy information is defined.

Optionally, the one or more areas comprise areas adjacent to an area corresponding to the current UE location data.

Optionally, the one or more areas are within a certain distance from an area corresponding to the current UE location data.

Optionally, the one or more further UE locations identify one or more areas, each area identifying one or more geographical locations.

Optionally, the one or more further UE locations may comprise a 3GPP_location, 3GPP2_location, WiMAX_location, WLAN_Location and Geo_location.

Optionally, the policy information unit is configured to determine the secondary information at least in part by querying a database storing data relating to areas for which access network policy information is defined.

Optionally, the policy information unit is further configured to determine the secondary information based at least in part on a user subscription profile associated with a user of the UE.

Optionally, the secondary information further specifies at least one time at which the UE should make a subsequent request for network access policy information.

Optionally, the policy information unit is further configured to determine the secondary information based on a level of congestion in the telecommunications network.

Optionally, the policy information unit is configured to determine the level of congestion based on information received from a congestion reporting entity.

Optionally, the policy information unit is configured to monitor the UE location and further configured to notify the UE if the UE is in a location where the level of congestion changes the secondary information.

Optionally, the receiver is configured to receive from the congestion reporting entity information identifying one or more UEs in an area, and the policy information unit is configured to determine one or more UEs that should be notified if the level of congestion in the area changes the secondary information.

According to the invention in a second aspect, there is provided a method for operating a communication device configured to form part of a telecommunications network and to carry out an access network discovery and selection function, ANDSF. The method comprises receiving, by a receiver, a request for access network policy information relating to a user equipment, UE, and current UE location data. The method comprises determining, by a policy information unit, primary information comprising access network policy information for the UE based at least in part on the current UE location data. The method comprises determining, by the policy information unit, secondary information specifying one or more further UE locations at which the UE should make a further request for access network policy information. The method comprises transmitting, by a transmitter, the primary and secondary information towards the UE.

Optionally, the one or more further UE locations identify one or more areas, each area identifying one or more radio access network technologies.

Optionally, the one or more further UE locations identify one or more areas for which network access policies are defined.

Optionally, the one or more further UE locations identify one or more areas, each area identifying one or more geographical locations.

Optionally, the one or more areas comprise one or more areas adjacent to an area corresponding to the current UE location data.

Optionally, the secondary information specifies at least one time at which the UE should make a subsequent request for access network policy information.

According to the invention in a third aspect, there is provided a non-transitory computer readable medium comprising computer readable code configured, when read by a computer, to carry out a method in accordance with the second aspect above.

According to the invention in a fourth aspect, there is provided a user equipment, UE, configured to communicate with a telecommunications network. The UE comprises a transmitter configured to transmit a request for access network policy information and current UE location data. The UE comprises a receiver configured to receive primary information comprising access network policy information based at least in part on the current UE location data and secondary information specifying one or more further UE locations at which the UE should make a further request for access network policy information. The UE comprises a policy information requestor configured to request further access network policy information when an updated UE location corresponds to one of the one or more further UE locations. The transmitter is configured to transmit the request for further access network policy information towards an access network discovery and selection function, ANDSF.

Optionally, the one or more further UE locations identify one or more areas, each area identifying one or more radio access network technologies.

Optionally, the one or more further UE locations identify one or more areas for which access network policy information is defined.

Optionally, the one or more further UE locations identify one or more areas, each area identifying one or more geographical locations.

Optionally, the one or more areas comprise one or more areas adjacent to an area corresponding to the current UE location data.

Optionally, the one or more areas are within a certain distance from an area corresponding to the current UE location data.

According to the invention in a fifth aspect, there is provided a method for operating a user equipment, UE, configured to communicate with a telecommunications network. The method comprises transmitting, by a transmitter, a request for access network policy information and current UE location data. The method comprises receiving, by a receiver, primary information comprising access network policy information based at least in part on the current UE location data and secondary information specifying one or more further UE locations at which the UE should make a further request for access network policy information. The method comprises requesting, by a policy information requestor, further access network policy information when an updated UE location corresponds to one of the one or more further UE locations. The method comprises transmitting, by the transmitter, the request for further access network policy information towards an access network discovery and selection function, ANDSF.

Optionally, the received one or more further UE locations identify one or more areas, each area identifying one or more radio access network technologies.

Optionally, the received one or more further UE locations identify one or more areas for which access network policy information is defined.

Optionally, the received one or more further UE locations identify one or more areas, each area identifying one or more geographical locations.

Optionally, the one or more areas comprise one or more areas adjacent to an area corresponding to the current UE location data.

Optionally, the one or more areas are within a certain distance from an area corresponding to the current UE location data.

According to the invention in a sixth aspect, there is provided a non-transitory computer readable medium comprising computer readable code configured, when read by a computer, to carry out a method according to the fifth aspect above.

BRIEF DESCRIPTION OF THE DRAWINGS

Exemplary embodiments of the invention are disclosed herein with reference to the accompanying drawings, in which.

DETAILED DESCRIPTION

Generally, disclosed herein are methods and apparatuses for providing information to a UE specifying when and/or where the UE should request access network policy information from an ANDSF. This leads to a number of advantages because the UE is not required to request access network policy information from the ANDSF when none is available and/or none has been defined.

In exemplary methods and apparatuses, the information provided to the UE may comprise location data, wherein access network policy information should be requested when the UE is at a location corresponding to the location data. In exemplary methods and apparatuses, the information provided to the UE may comprise a temporal data, wherein the UE should request access network policy information at a time corresponding to the temporal data. In exemplary methods and apparatuses, the information provided to the UE may comprise these location data with associated temporal data, The inventors have appreciated that network operators are interested in making use of the capabilities of the ANDSF in determined areas, such as, for example, well known areas (such as cells, geographical locations, location areas or tracking areas) that correspond to crowded locations and lead to situations in which an access network (for example, 3GPP cells) is congested. Therefore, the UE location can be used to alleviate congestion that might occur in some access networks (for example, at peak traffic hours) and, in this respect, the methods and apparatuses disclosed may comprise one or more of:

an ANDSF sending to the UE information about the locations and/or times, at which policies should be requested from the ANDSF; and a UE determining, based on the location information, when access network policy retrieval from the ANDSF should be undertaken.

An operator may be interested in providing access network policy information to UEs only in specific locations. Further, an operator may be interested in providing access network policy information to UEs only at specific times, such as when access networks in a particular location are likely to become crowded. Therefore, the methods and apparatuses disclosed may be considered to provide ANDSF access network policy information retrieval by the UE only in the locations of interest for an operator, so as to optimise the signalling over the S14 interface between the UE and the ANDSF.

The inventors have also appreciated that, although the standards mentioned herein provide a mechanism to indicate the validity of a rule in terms of location, they do not provide a mechanism to indicate when the UE should request new policies from the ANDSF, for example, when the UE moves to a location where the operator has specified access network selection policies.

The methods and apparatuses disclosed provide more information to the UE, allowing it to be more intelligent regarding the situations where new access network policy information is required. In particular, the methods and apparatuses disclosed may provide that an ANDSF informs the UE about areas of interest, for example, areas adjacent to an area corresponding to current UE location and where the UE should ask for new access network policy information. An ANDSF may send to a UE only information relating to adjacent areas or areas within a certain distance; otherwise the amount of information sent to the UE may be unmanageable, although that depends on the amount of areas applicable in each case.

The methods and apparatus disclosed provide a mechanism to solve the problem of determining the appropriate locations and/or times at which a UE should request access network discovery and selection data from an ANDSF, thereby avoiding over signaling between UE and ANDSF when it is unnecessary.

Figure 1:
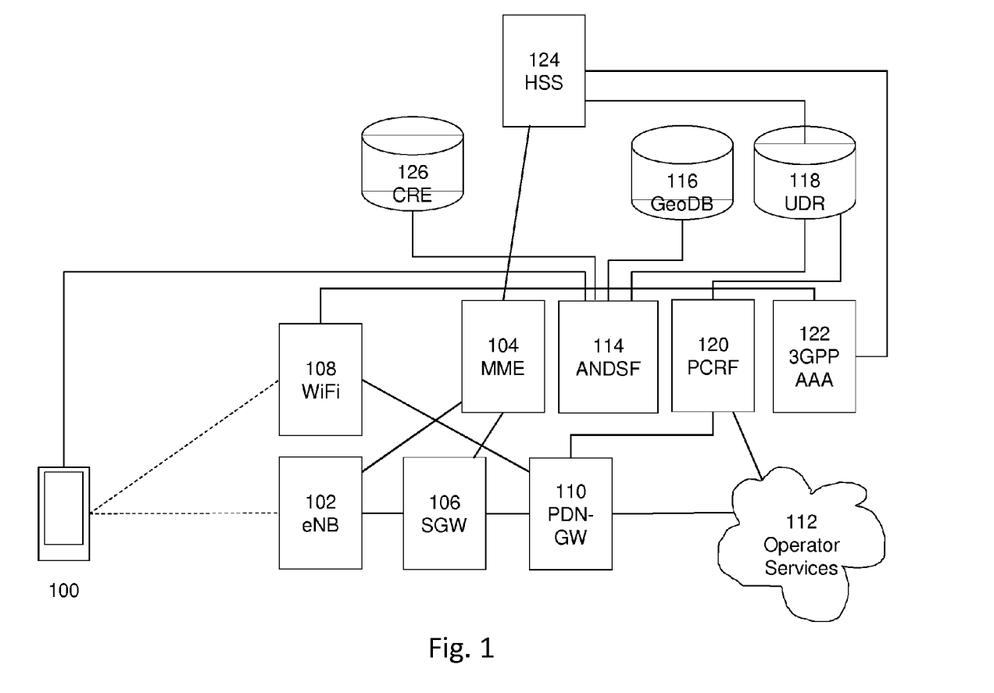
FIG. 1 is a schematic representation of a telecommunications network.

FIG. 1 shows an exemplary telecommunications system. A UE 100 is in communication with a 3GPP RAT and specifically, an enhanced NodeB (eNB or eNodeB) 102, which in turn is connected via S1-interfaces S1-MME and S1-U to a mobility management entity (MME) 104 and serving gateway (SGW) 106 respectively. The SGW 106 is also connected to the MME 104 via the S11 interface. The UE 100 is also in communication with a Wi-Fi RAT 108. The Wi-Fi RAT 108 is connected to a packet data network gateway (PDN-GW) 110, which may also be called a packet gateway (P-GW), via an S2a interface. The PDN-GW 110 provides access to operator service 112 via the SGi interface. The UE 100 is in communication with an ANDSF 114. The ANDSF 114 is in electrical communication with a geographic database (geoDB) 116 and a user data repository (UDR) 118 via the Ud interface. A policy and charging rules function (PCRF) 120 is in electrical communication with the UDR 118, with the PDN-GW 110 via the Gx interface, and with the operator services 112 via the Rx interface. The Wi-Fi RAT 108 is in electrical communication with a 3GPP authentication, authorization and accounting (AAA) server 122. A home subscriber server (HSS) 124 is in electrical communication with the UDR 118, with the MME 104 via the S6a interface, and with the 3GPP AAA via the SWx interface. A congestion reporting entity (CRE) 126 is in electrical communication with the ANDSF 114.

The functionality of the features of FIG. 1, as they relate to the methods and apparatuses disclosed herein are provided below. In addition, the features of FIG. 1 may be given their usual functionality in a telecommunications network.

Figure 2:
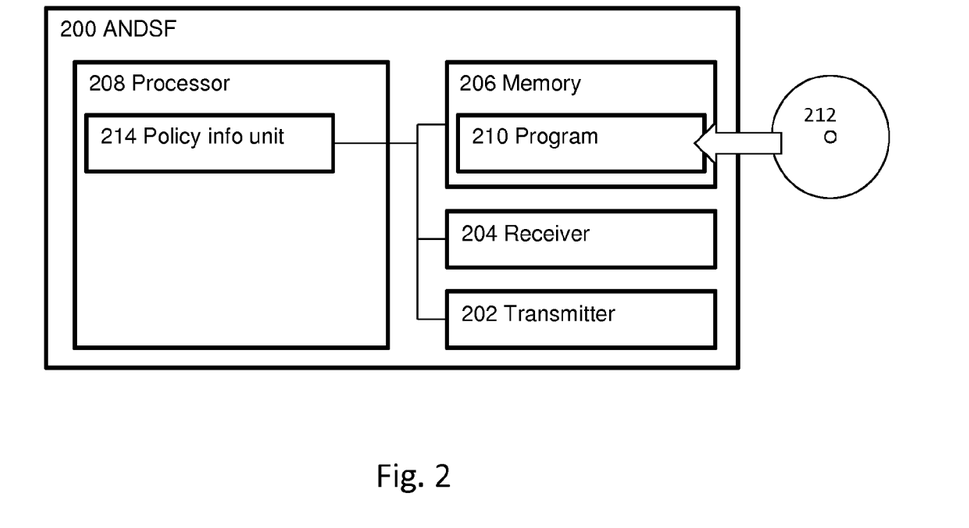
FIG. 2 is a schematic representation of an ANDSF.

FIG. 2 shows a schematic representation of an ANDSF 200. The ANDSF 200 comprises a transmitter 202 and a receiver 204. The transmitter 202 and receiver 204 are in electrical communication with other communication units, UEs, servers and/or functions in a telecommunications network and are configured to transmit and receive data accordingly.

It is noted that the term "electrical communication", unless otherwise stated, encompasses any one of wired and wireless electrical communication, or both. Therefore, electrical communication may be, for example, a network communication over a wired connection or a network communication of over a radio frequency connection, or both.

The ANDSF 200 further comprises a memory 206 and a processor 208. The memory 206 may comprise a non-volatile memory and/or a volatile memory. The memory 206 may have a computer program 210 stored therein. The computer program 210 may be configured to undertake the methods disclosed herein. The computer program 210 may be loaded in the memory 206 from a non-transitory computer readable medium 212, on which the computer program is stored. The processor 208 is configured to undertake at least the functions of a policy information unit 214, as set out below.

Each of the transmitter 202 and receiver 204, memory 206, processor 208 and policy information unit 214 is in electrical communication with the other features 202, 204, 206, 208, 210, 214 of the ANDSF 200. The ANDSF 200 can be implemented as a combination of computer hardware and software. In particular, the policy information unit 214 may be implemented as software configured to run on the processor 208. The memory 206 stores the various programs/executable files that are implemented by a processor 208, and also provide a storage unit for any required data. The programs/executable files stored in the memory 206, and implemented by the processor 208, can include the policy information unit 214, but are not limited to such.

Figure 3:
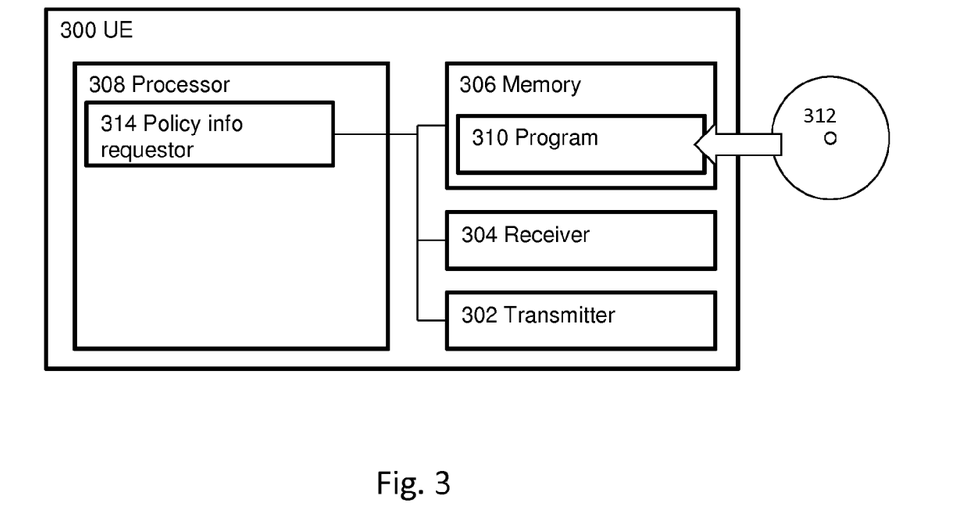
FIG. 3 is a schematic representation of a UE.

FIG. 3 shows a schematic representation of a UE 300. The UE 300 comprises a transmitter 302 and a receiver 304. The transmitter 302 and receiver 304 are in electrical communication with other communication units, UEs, servers and/or functions in a computer network and configured to transmit and receive data accordingly.

The UE 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake at least the functions of a policy information requestor 314, as set out below.

Each of the transmitter 302, receiver 304, memory 306, processor 308 and policy information requestor 314 is in electrical communication with the other features 302, 304, 306, 308, 310, 314 of the UE 300. The UE 300 can be implemented as a combination of computer hardware and software. In particular, the policy information requestor 314 may be implemented as software configured to run on the processor 308. The memory 306 stores the various programs/executable files that are implemented by a processor 308, and also provide a storage unit for any required data. The programs/executable files stored in the memory 306, and implemented by the processor 308, can include the policy information requestor 314, but are not limited to such.

The telecommunications network shown in FIG. 1 may comprise an ANDSF 200 and a UE 300, as shown in FIGS. 2 and 3.

Figure 4:
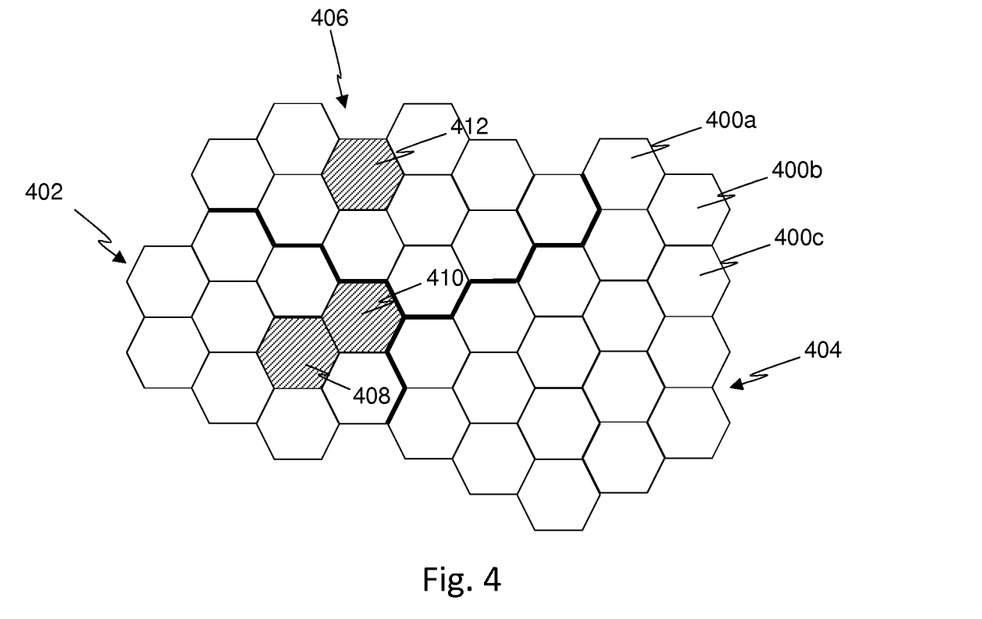
FIG. 4 is a schematic representation of adjacent location areas comprising a plurality of cells.

FIG. 4 shows a plurality of cells 400*a*-*c* of a telecommunications network. Only the cells 400*a*-*c* are labeled in FIG. 4, however, it will be understood that all of the hexagonal shapes in FIG. 4 represent different cells. The collection of cells comprises three areas 402, 404, 406, each of which comprises a plurality of cells 400. The area 402 comprises cells 408, 410, which are shaded to indicate that access network policy information is defined for a UE 100 to connect to a Wi-Fi access 108 when located in those cells. Similarly, area 406 comprises cell 412, at which access network policy information is defined for a UE 100 to connect to Wi-Fi access 108. In other exemplary networks, any access network policy may be undertaken in the shaded cells 408, 410, 412. The area 404 comprises no cells in which access network policy information is defined.

Figure 5:
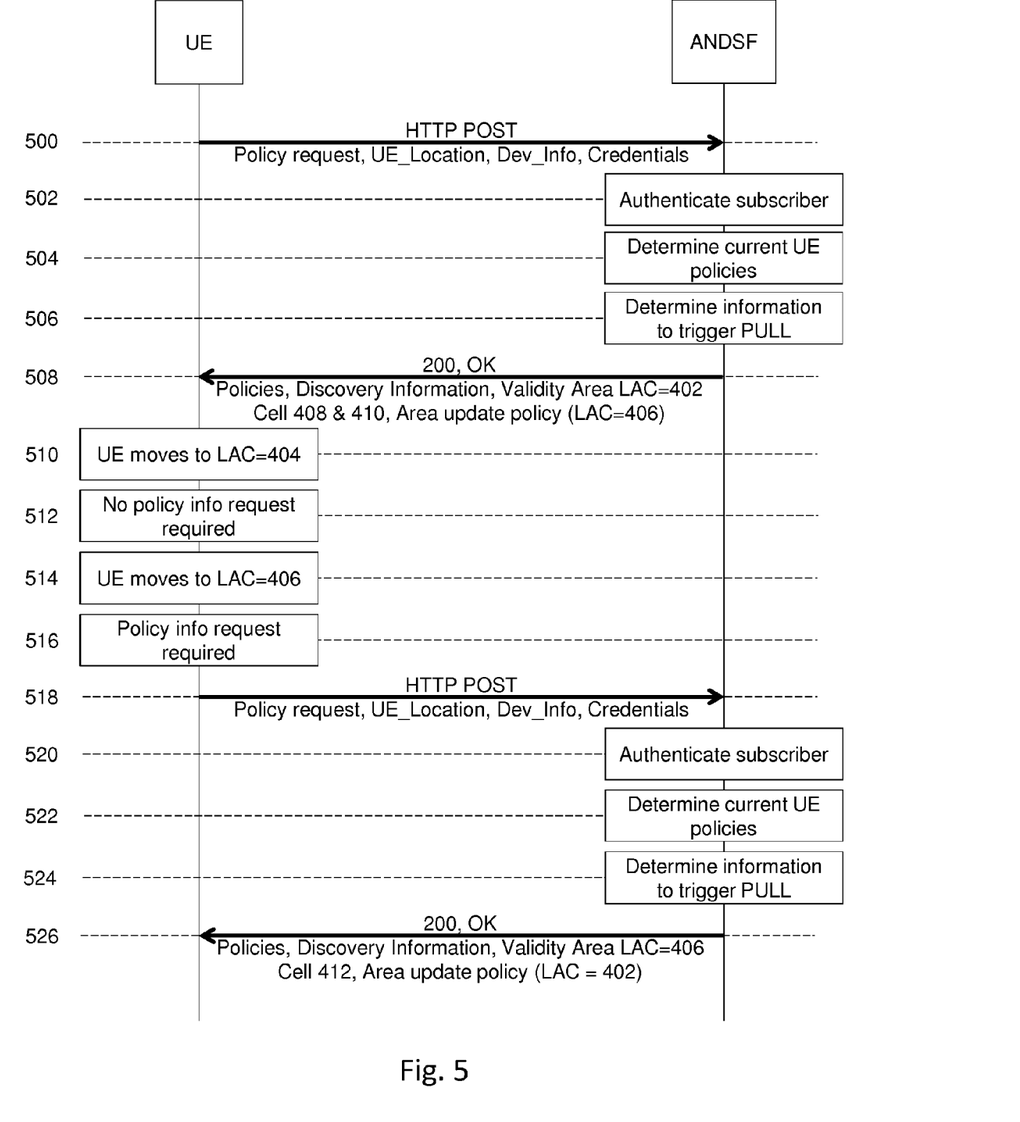
FIG. 5 is a signalling diagram showing signalling for triggering an access network policy information request by a UE.

FIG. 5 shows a signaling diagram for a method for controlling requests for access network policy information from a UE 100 to an ANDSF 114.

A user powers on a UE 100 and attaches to the telecommunications network and establishes, for example, an open mobile allowance (OMA) device management (DM) session towards the ANDSF 114. The transmitter 302 of the UE 100 transmits a request 500 for access network policy information. The policy information requestor 314 of the UE 100 provides UE location information that is transmitted along with the request for access network policy information. In the exemplary method of FIG. 5, the UE 100 is in cell 408 of location area 402 (see FIG. 4), device information, policy request indication and credentials are provided by the UE together with the UE location.

The ANDSF 114 may authenticate 502 the user. The policy information unit 214 of the ADNSF 114 determines 504 primary information comprising access network policy information applicable to the UE 100, at least in part based on the UE location information. The primary information may also be determined based on a subscriber profile, which may be obtained by the policy information unit 214 from the UDR 118, temporal information and/or congestion information relating to the location of the UE 100.

The policy information unit 214 of the ANDSF 114 determines 506 secondary information specifying when the UE 100 should make a further request to the ANDSF 114 for access network discovery and selection policy information. The secondary information may specify one or more further UE locations at which the UE should make a further request for access network policy information. The secondary information may comprise location information and/or temporal information.

In the case that the secondary information comprises temporal information, a time or a range of times may be determined at which or during which the UE 100 should make a further request for access network policy information. In the case where the secondary information comprises location information in terms of the one or more further UE locations, one or more areas may be determined wherein the UE 100 should request further access network policy information when it is located at one of the one or more areas.

For the exemplary method of FIG. 5, a location area is specified, but other types of secondary information are also possible.

An "area" as defined in the claims, may include a location area, a tracking area a routing area, a geographical area and/or one or more locations. In exemplary methods and apparatuses, the location data in the secondary information corresponds with location areas adjacent to the current location area of UE 100, based on the location data for the UE 100.

The transmitter 302 of the ANDSF 114 transmits 508 the primary information together with the secondary information specifying a location area (LAC 406) at which the UE 100 shall transmit a further request for access network policy information to the ANDSF 114. In the example shown in FIG. 5, the policy information unit of the ANDSF 114 indicates that the UE 100 shall connect to Wi-Fi at its current location. Validity area information is specified as location area 402 (which may have a location area code (LAC) 0x0001) and cells 408 and 410. In addition, the policy information unit 214 of the ANDSF 114 provides the areas of interest in which the UE shall make a further request for access network policy information. That is, the policy information unit 214 of the ANDSF 114 provides an area specifying one or more UE locations at which the UE 100 should make a further request for access network policy information from the ANDSF 114. In the example of FIG. 5, this area comprises location area 406 (which may have a LAC 0x0003).

Note that location area 404 (which may have a LAC 0x0002) is not returned because there is no access network policy information defined for this area. That is, none of the cells in location area 406 has any access network policies defined.

The UE 100 moves 510 to location area 404. As this area was not in the secondary information it is not stored in the memory 306 of the UE 100 as an area at which the UE 100 shall trigger a further request for access network policies. Therefore, the policy information requestor 314 determines that the UE location does not correspond to an area in the secondary information. As such, no further policy request is required 512 and the transmitter 302 of the UE 100 does not transmit a request to the ANDSF 114.

The UE 100 moves 514 to location area 406. As this area was in the secondary information it is stored in the memory 306 of the UE 100 as an area at which the UE 100 shall trigger request for ANDSF policies. Therefore, the policy information requestor 314 determines that the UE location corresponds to this area in the secondary information. As such, a further access network policy information request is required 516 and the transmitter 302 of the UE 100 transmits 518 the request to the ANDSF 114.

As with steps 502-506, the ANDSF 114 authenticates the subscriber 520, determines the primary information 522 with the new access network policy information, determines the secondary information 524 and transmits 526 the primary information and the secondary information to the UE 100. In the example of FIG. 5, the secondary information comprises the location area 402, which is the adjacent area in which access network policy information is defined.

Generally speaking, the ANDSF 114 may be enabled to calculate the areas of interest at initial attach, and at any time during the UE 100 session, upon reception of a UE 100 request or upon reception of any other trigger. The trigger may be an ANDSF internal trigger (e.g. a timer) or an external trigger (e.g. a user subscription change or updated network congestion information reception from an external entity).

For updates initiated from the ANDSF 114, a WAP PUSH message over SMS bearer may be sent towards the UEs for which the updated primary and/or secondary information is relevant for them to trigger a request for access network policy information from the ANDSF 114.

Figure 6:
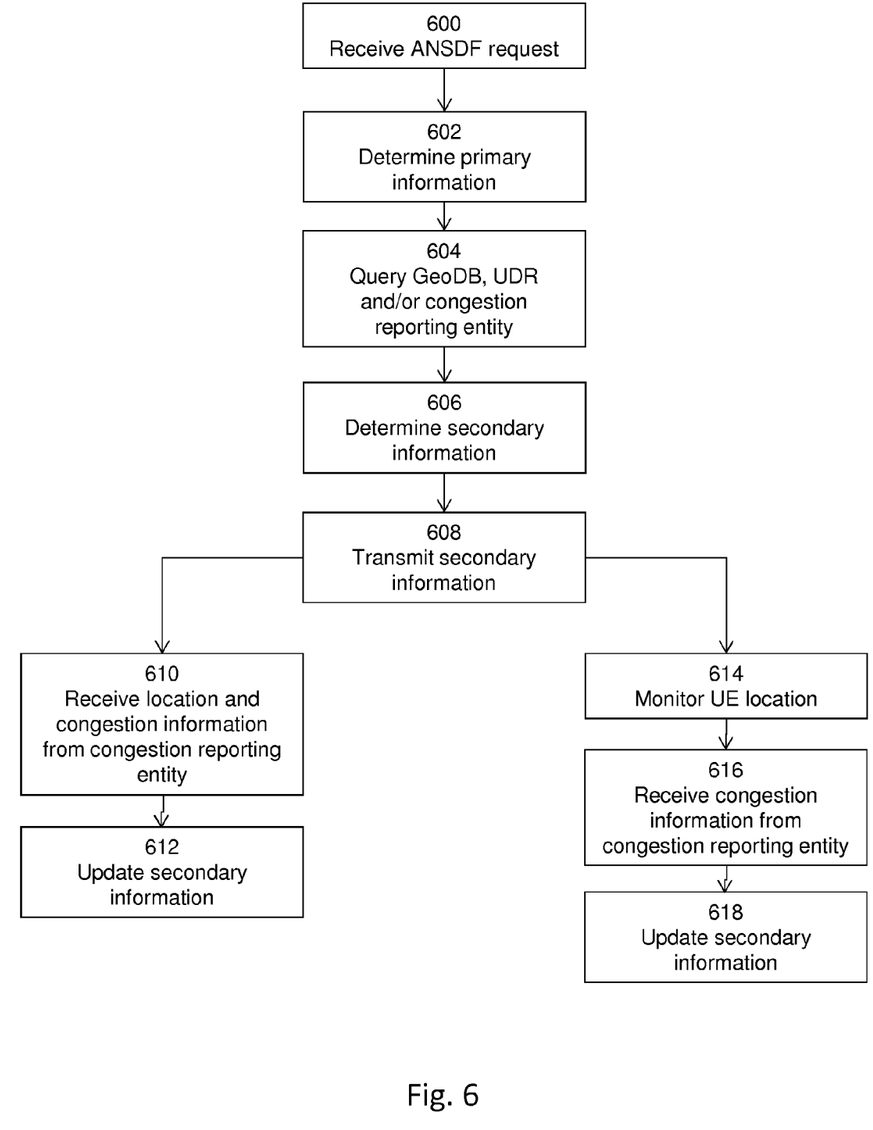
FIG. 6 is a flow diagram showing a method for transmitting access network policy information from an ANDSF.

FIG. 6 shows a flow diagram for a method of operating an ANDSF 114. The receiver 204 receives a request for access network policy information from the UE 100. The policy information unit 214 determines 602 the primary information comprising access network policy information based at least on the current UE 100 location.

The policy information unit queries 604 whatever databases are required to be queried to obtain the information necessary to determine the secondary information. As such, the policy information unit may query one or more of a database (such as a geodetic database 116) and UDR 118 comprising information about the different areas, and a congestion reporting entity 126.

The policy information unit 214 determines 606 the secondary information. The policy information unit 214 may base the determination on one or more of:

- The current UE 100 location. The UE 100 location is important since the ANDSF 114 shall only inform the UE 100 about the adjacent or proximal areas to the one corresponding to the current UE location, and where the UE 100 shall make a further request for access network policies. The ANDSF 114 could not send all the areas in the operator network where access network policies are defined, as this could represent an unmanageable amount of information for the UE 100. The policy information unit 214 may calculate areas of interest considering the UE 100 location and the information about the operator areas that may be provided by the data base (GeoDB) 116.

It is possible to determine the granularity that the policy information unit 214 provides to calculate the areas of interest, e.g. the policy information unit 214 may provide the areas of interest that are within a predetermined distance (e.g., 10 km) of the current UE 100 location.

- The user policies stored, for example, in the UDR 118. The areas of interest in which access network policies are defined may depend on a user's subscription. For example, a user shall use certain Wi-Fi access at the user's home, or at the user's office.

- The time of day. Certain areas may become of interest (that is, they have access network policies defined or the access network policy for the area changes) only at certain times during a day.

- Network congestion information received, for example, from the CRE 126. Some areas may become of interest depending on whether they are congested or not. For example, in an area where LTE access is congested the ANDSF 114 may decide to move certain users to Wi-Fi access, for example "bronze" users, so "gold" users still enjoy LTE without a degraded service.

The transmitter 202 transmits 608 the secondary information to the UE 100.

After the secondary information has been transmitted to the UE 100, that secondary information may be managed dynamically by the policy information unit 214. That is, the policy information unit 214 may be configured to monitor one or more factors influencing the secondary information and, if a change in the factors is determined to affect the secondary information for a UE 100, to initiate the transmission of updated secondary information to that UE 100. The monitored factors may comprise network congestion, time and subscriber information. Steps 610 to 618 show dynamic management of the secondary information based on congestion information.

Network congestion information can be provided to the ANDSF 114 from an external entity, such as the CRE 126, that is aware of the congestion situation of the cells and areas in the operator network. Based on that congestion information, the ANDSF 114 can provide the UEs located in those areas or in surrounding areas with the updated secondary information.

The CRE 126 is configured to analyze the radio network status in terms of congestion. Typically this kind of CRE 126 receives periodically key performance indicators from the radio network and calculates the areas that are in a congestion situation. Standards may also specify that the radio network reports the congestion information to the core network via existing signaling interfaces (e.g., GTP).

In exemplary methods and apparatuses, the CRE 126 reports 610 to the ANDSF 114 information on congestion in certain areas of the network and a list of UEs 100 that are in congested areas. The policy information unit 214 then determines 612 updated secondary information for the UEs on the list and initiates transmission of the updated secondary information to those UEs.

In other exemplary methods and apparatuses, the ANDSF 114 monitors 614 a UE 100 location. The ANDSF 114 then receives 616 from the CRE 126 information on congestion in the network. The policy information unit 214 then determines whether any UEs 100 are in congested areas of the network, updates 618 the secondary information and initiates transmission of the updated secondary information to those UEs 100.

In exemplary methods and apparatuses, the ANDSF 114 may provide a UE 100 with a pull interval time that indicates a validity time for the primary information currently held by the UE 100. Therefore, the UE 100 asks for new access network policy information periodically. This allows a UE to obtain updated secondary information after a congestion situation has been detected at the next pull interval, after the pull interval time is expired. Although this solution is not real-time, it is a compromise between signaling in the network and reaction time in case of congestion.

Figure 7:
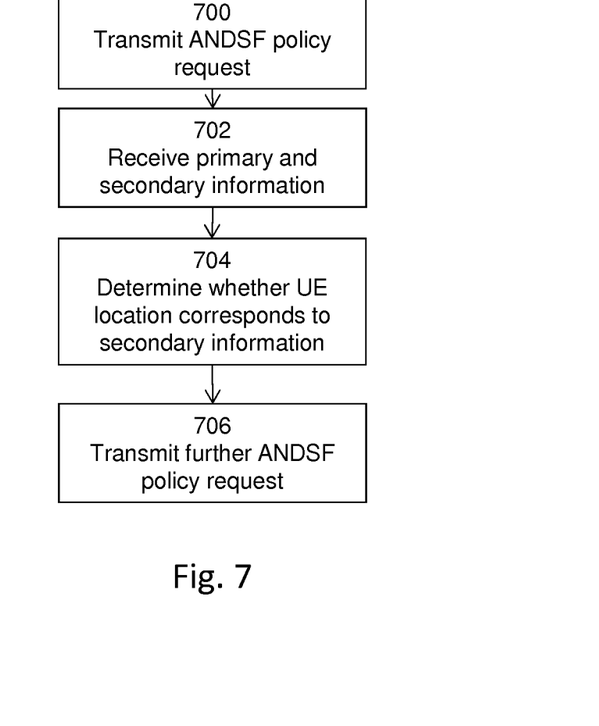
FIG. 7 is a flow diagram showing a method for receiving access network policy information at a UE.

FIG. 7 shows a method for operating a UE 100. A transmitter 302 transmits 700 a request for access network policy information to an ANDSF 114. The request comprises current UE location data. The receiver 304 receives 704 primary information comprising network access policy information based at least in part on the current UE location data, and secondary information specifying one or more further locations at which a further request for access network policy information should be made. The policy information requestor 314 determines 704 whether the UE location corresponds to one of the further locations. If so, the policy information requestor 314 requests further access network policy information, the request being transmitted 706 by the transmitter 302.

The received secondary information may comprise any of the information set out above. For instance, as already commented above, the one or more further UE locations may comprise a 3GPP_location, 3GPP2_location, WiMAX_location, WLAN_Location and Geo_location. Also for instance, as already commented above, the one or more further UE locations may identify one or more areas, wherein each area may include a location area, a tracking area a routing area, a geographical area and/or one or more locations.

Moreover, when more granularity is required, the secondary information may be expressed in terms of location information elements defined for each type of UE location. For example, for a 3GPP_location type, the secondary information may include anyone of: PLMN, TAC, LAC, GERAN_CI, UTRAN_CI and EUTRA_CI.

In exemplary methods and apparatuses, the standardized S14 interface between UE and ANDSF 114 may be extended to convey the secondary information related to the areas of interest. In particular exemplary methods and apparatuses, the secondary information conveying the areas for triggering the PULL request from the UE 100, may be inserted within a new information node named "AreaOfUpdatePolicy" of the ANDSF Management Object (MO) defined in FIG. 4.2.4 of the aforementioned 3GPP TS 24.312.

In exemplary methods and apparatuses, the UE 100 may be enabled to receive secondary information from the ANDSF 114 about the areas of interest. Besides that, the UE 100, and in particular the policy information requestor 314, may have the procedures necessary to compare the current UE location with the further UE locations received in the secondary information from the ANDSF 114, and to trigger a request towards the ANDSF 114 whenever the UE enters any of the further UE locations.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatuses are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A communication device configured to form part of a telecommunications network and to carry out an access network discovery and selection function, ANDSF, the communication device comprising:
   a receiver configured to receive a request for access network policy information relating to a user equipment, UE, and current UE location data;
   a processor configured to determine primary information comprising access network policy information for the UE based at least in part on the current UE location data,
   wherein the processor is further configured to determine secondary information specifying one or more further UE locations at which the UE should make a further request for access network policy information; and
   a transmitter configured to transmit the primary and secondary information towards the UE.

2. A communication device according to claim 1, wherein the one or more further UE locations identify one or more areas, each area identifying one or more radio access network technologies.

3. A communication device according to claim 1, wherein the one or more further UE locations identify one or more areas for which access network policy information is defined.

4. A communication device according to claim 2, wherein the one or more areas comprise areas adjacent to an area corresponding to the current UE location data.

5. A communication device according to claim 2, wherein the one or more areas are within a certain distance from an area corresponding to the current UE location data.

6. A communication device according to claim 1, wherein the one or more further UE locations identify one or more areas, each area identifying one or more geographical locations.

7. A communication device according to claim 3, wherein the processor is configured to determine the secondary information at least in part by querying a database storing data relating to areas for which access network policy information is defined.

8. A communication device according to claim 1, wherein the processor is further configured to determine the secondary information based at least in part on a user subscription profile associated with a user of the UE.

9. A communication device according to claim 1, wherein the secondary information further specifies at least one time at which the UE should make a subsequent request for network access policy information.

10. A communication device according to claim 1, wherein the processor is further configured to determine the secondary information based on a level of congestion in the telecommunications network.

11. A communication device according to claim 10, wherein the processor is configured to determine the level of congestion based on information received from a congestion reporting entity.

12. A communication device according to claim 10, wherein the processor is configured to monitor the UE location and further configured to notify the UE if the UE is in a location where the level of congestion changes the secondary information.

13. A communication device, according to claim 11, wherein the receiver is configured to receive from the congestion reporting entity information identifying one or more UEs in an area,
   and wherein the processor is configured to determine one or more UEs that should be notified if the level of congestion in the area changes the secondary information.

14. A method for operating a communication device configured to form part of a telecommunications network and to carry out an access network discovery and selection function, ANDSF, the method comprising:
   receiving, by a receiver, a request for access network policy information relating to a user equipment, UE, and current UE location data;
   determining, by a processor, primary information comprising access network policy information for the UE based at least in part on the current UE location data;
   determining, by the processor, secondary information specifying one or more further UE locations at which the UE should make a further request for access network policy information; and
   transmitting, by a transmitter, the primary and secondary information towards the UE.

15. A method according to claim 14, wherein the one or more further UE locations identify one or more areas, each area identifying one or more radio access network technologies.

16. A method according to claim 14, wherein the one or more further UE locations identify one or more areas for which network access policies are defined.

17. A method according to claim 14, wherein the one or more further UE locations identify one or more areas, each area identifying one or more geographical locations.

18. A method according to claim 14, wherein the one or more areas comprise one or more areas adjacent to an area corresponding to the current UE location data.

19. A non-transitory computer readable medium comprising computer readable code configured, when read by a computer, to carry out the method according to claim 14.

20. A user equipment, UE, configured to communicate with a telecommunications network, the UE comprising:
   a transmitter configured to transmit a request for access network policy information and current UE location data;
   a receiver configured to receive primary information comprising access network policy information based at least in part on the current UE location data and secondary information specifying one or more further UE locations at which the UE should make a further request for access network policy information,
   a processor configured to request further access network policy information when an updated UE location corresponds to one of the one or more further UE locations,
   wherein the transmitter is configured to transmit the request for further access network policy information towards an access network discovery and selection function, ANDSF.

21. A UE according to claim 20, wherein the one or more further UE locations identify one or more areas, each area identifying one or more radio access network technologies.

22. A UE according to claim 20, wherein the one or more further UE locations identify one or more areas for which access network policy information is defined.

23. A UE according to claim 20, wherein the one or more further UE locations identify one or more areas, each area identifying one or more geographical locations.

24. A UE according to claim 21, wherein the one or more areas comprise one or more areas adjacent to an area corresponding to the current UE location data.

25. A UE according to claim 21, wherein the one or more areas are within a certain distance from an area corresponding to the current UE location data.

26. A method for operating a user equipment, UE, configured to communicate with a telecommunications network, the method comprising:
   transmitting, by a transmitter, a request for access network policy information and current UE location data;
   receiving, by a receiver, primary information comprising access network policy information based at least in part on the current UE location data and secondary information specifying one or more further UE locations at which the UE should make a further request for access network policy information;
   requesting, by a processor, further access network policy information when an updated UE location corresponds to one of the one or more further UE locations; and
   transmitting, by the transmitter, the request for further access network policy information towards an access network discovery and selection function, ANDSF.

27. A method according to claim 26, wherein the received one or more further UE locations identify one or more areas, each area identifying one or more radio access network technologies.

28. A method according to claim 26, wherein the received one or more further UE locations identify one or more areas for which access network policy information is defined.

29. A method according to claim 26, wherein the received one or more further UE locations identify one or more areas, each area identifying one or more geographical locations.

30. A method according to claim 27, wherein the one or more areas comprise one or more areas adjacent to an area corresponding to the current UE location data.

31. A method according to claim 27, wherein the one or more areas are within a certain distance from an area corresponding to the current UE location data.

32. A non-transitory computer readable medium comprising computer readable code configured, when read by a computer, to carry out the method according to claim 26.

* * * * *